(12) United States Patent
Hsu

(10) Patent No.: US 10,363,983 B2
(45) Date of Patent: Jul. 30, 2019

(54) MAGNETIC COUPLING DEVICE

(71) Applicant: Sunny Wheel Industrial Co., Ltd., Chang Hua Hsien (TW)

(72) Inventor: Kuo-Chung Hsu, Chang Hua Hsien (TW)

(73) Assignee: SUNNY WHEEL INDUSTRIAL CO., LTD., Chang Hua Hsien (TW)

(*) Notice: Subject to any disclaimer, the term of this patent is extended or adjusted under 35 U.S.C. 154(b) by 293 days.

(21) Appl. No.: 15/383,589

(22) Filed: Dec. 19, 2016

(65) Prior Publication Data
US 2018/0057094 A1    Mar. 1, 2018

(30) Foreign Application Priority Data

Aug. 24, 2016   (TW) .............................. 105126992 A

(51) Int. Cl.
*B62J 15/02*    (2006.01)
*F16H 25/18*    (2006.01)

(52) U.S. Cl.
CPC ............ *B62J 15/02* (2013.01); *F16H 25/186* (2013.01)

(58) Field of Classification Search
CPC . B62J 15/02; F16B 2001/0035; Y10S 403/01; F16H 25/08; Y10T 24/32; Y10T 292/11
See application file for complete search history.

(56) References Cited

U.S. PATENT DOCUMENTS

| | | | | |
|---|---|---|---|---|
| 5,425,763 A | * | 6/1995 | Stemmann | A61C 8/0081 335/285 |
| 5,996,831 A | * | 12/1999 | Teok | E05B 47/004 220/230 |
| 7,120,972 B2 | * | 10/2006 | O' Banion | A42B 1/24 24/303 |
| 7,377,560 B2 | * | 5/2008 | Wiemer | E05C 19/16 292/251.5 |
| 7,889,036 B2 | * | 2/2011 | Fiedler | H01F 7/0263 292/251.5 |
| 7,942,458 B2 | * | 5/2011 | Patterson | E05C 19/16 292/251.5 |

(Continued)

FOREIGN PATENT DOCUMENTS

CN    203020465 U    6/2013
JP    3200327 U    10/2015

OTHER PUBLICATIONS

EP Search Report issued to EP counterpart application No. 17159658.8 by the EPO dated Sep. 27, 2017 (6 pages).

*Primary Examiner* — Jonathan P Masinick
(74) *Attorney, Agent, or Firm* — Hamre, Schumann, Mueller & Larson, P.C.

(57) ABSTRACT

A magnetic coupling device includes a first seat, a second seat, a magnetic unit and a releasing member. The second seat is connected to the first seat. The magnetic unit includes a first member disposed in the first seat, and a second member disposed in the second seat. The releasing member is connected to the first seat and the second seat, and is convertible between a linked position, where the second seat is proximate to the first seat, and the second member is magnetically connected to the first member, and a released position, where the second seat is away from the first seat, and the second member is separated from the first member.

6 Claims, 5 Drawing Sheets

(56) References Cited

U.S. PATENT DOCUMENTS

| | | | |
|---|---|---|---|
| 8,863,563 B2* | 10/2014 | Gentile | E05B 47/0038 24/303 |
| 9,101,185 B1* | 8/2015 | Greenberg | A44C 5/20 |
| 9,715,960 B2* | 7/2017 | Chaizy | H01F 7/0242 |
| 9,963,913 B2* | 5/2018 | Howell | E05B 47/0038 |
| 2008/0122150 A1* | 5/2008 | Kegeris | B25B 11/002 269/8 |
| 2012/0044031 A1* | 2/2012 | Ninomiya | H01F 7/0263 335/219 |
| 2018/0178868 A1* | 6/2018 | Hsu | B62J 15/02 |

* cited by examiner

US 10,363,983 B2

MAGNETIC COUPLING DEVICE

CROSS-REFERENCE TO RELATED APPLICATION

This application claims priority of Taiwanese Patent Application No. 105126992, filed on Aug. 24, 2016.

FIELD

The disclosure relates to a coupling device, and more particularly to a magnetic coupling device adapted to couple a strut and a mudguard of a bicycle.

BACKGROUND

A mudguard is disposed over a wheel of a bicycle for preventing splashing of water or mud onto the wheel. Generally, a method of installing the mudguard on the bicycle is to use a coupling device having an end that is connected to a strut fixed on a frame of the bicycle, and an opposite end that is connected to the mudguard.

During cycling, clothing of a cyclist may be caught between the strut and the mudguard and may cause serious injury to the cyclist. In order to prevent such danger, a coupling device, such as one of those disclosed in European Patent Nos. 0694469B, 1867562B1, 2072386B1, and 2832630B1, and European Publication Nos. 1151911A1 and 1834866A1, is employed to link the mudguard and the strut, and is separable into parts for safety release of the mudguard from the strut. However, after the separation of the above-mentioned conventional coupling device, a user needs to precisely align the separated parts to reassemble the conventional coupling device, thereby causing inconvenience in use.

German Patent No. 202011103944U1 discloses a mudguard assembly, which includes a plurality of magnets disposed on the strut for attaching a bag or a basket thereto. However, the magnets are not related to safety release of the mudguard.

SUMMARY

Therefore, an object of the disclosure is to provide a magnetic coupling device that can alleviate at least one of the drawbacks associated with the abovementioned prior art.

Accordingly, the magnetic coupling device includes a first seat, a second seat, a magnetic unit, and a releasing member. The second seat is connected to the first seat. The magnetic unit includes a first member disposed in the first seat, and a second member disposed in the second seat. The releasing member is connected to the first and the second seat. The releasing member is convertible between a linked position, where the second seat is proximate to the first seat, and the second member is magnetically connected to the first member, and a released position, where the second seat is away from the first seat, and the second member is separated from the first member.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
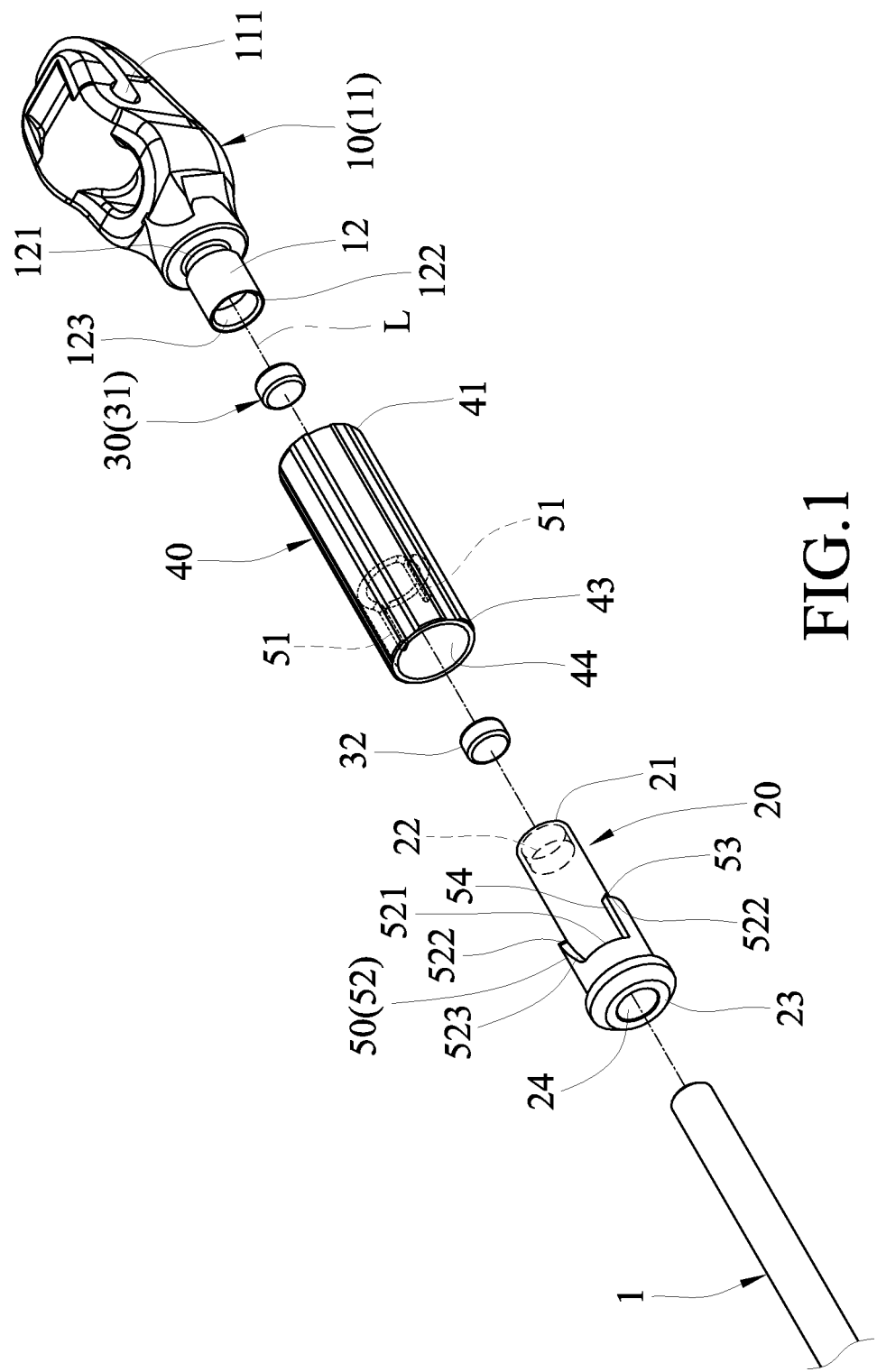
FIG. 1 is an exploded perspective view of an embodiment of a magnetic coupling device according to the present disclosure.
Figure 2:
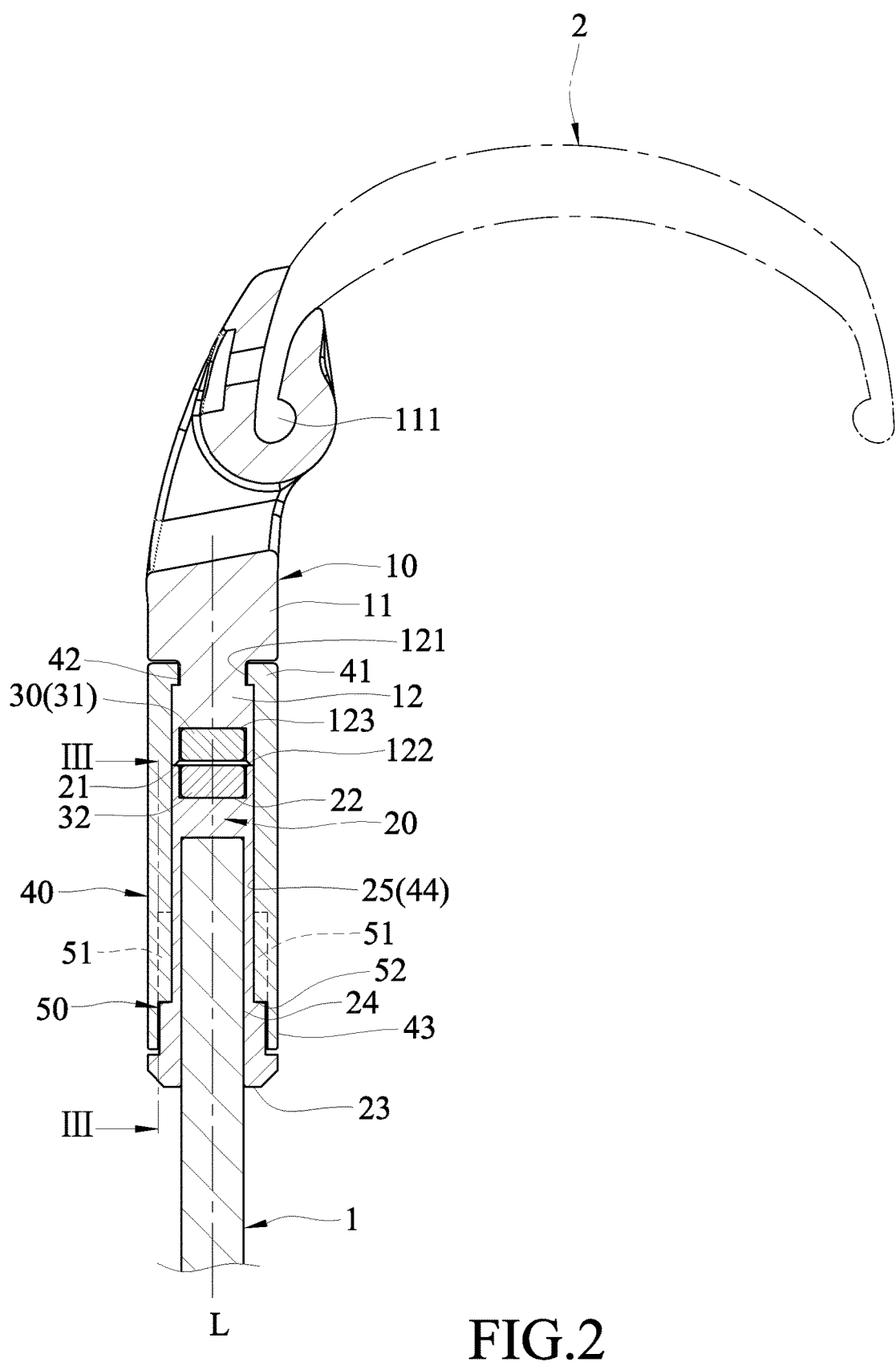
FIG. 2 is a sectional view of the embodiment, illustrating a releasing member being in a linked position.

As shown in FIGS. 1 and 2, an embodiment of a magnetic coupling device according to the present disclosure is adapted to couple a strut 1 to a mudguard 2. The magnetic coupling device includes a first seat 10, a second seat 20, a magnetic unit 30, a releasing member 40, and a cam unit 50.

In this embodiment, the first seat 10 has a main body 11, and a protruding member 12 protruding from the main body 11 along an axis (L). The main body 11 has an engaging groove 111 that is opposite to the protruding member 12, and that is adapted to be engaged with the mudguard 2. The protruding member 12 has a ring-shaped groove 121, a first end surface 122, and a first recess 123. The ring-shaped groove 121 surrounds the axis (L), and is proximate to the main body 11. The first end surface 122 is distal from the main body 11, and is perpendicular to the axis (L). The first recess 123 is formed in the first end surface 122.

The second seat 20 is connected to the first seat 10, and extends along the axis (L). The second seat 20 has a second end surface 21, a second recess 22, an outer distal surface 23, an installing hole 24, and an outer surrounding surface 25. The second end surface 21 faces the first end surface 122. The second recess 22 is formed in the second end surface 21. The outer distal surface 23 is opposite to the second end surface 21 along the axis (L). The installing hole 24 is formed in the outer distal surface 23, and is adapted for insertion of the strut 1. The outer surrounding surface 25 extends from the second end surface 21 to the outer distal surface 23.

The magnetic unit 30 includes a first member 31 that is disposed in the first seat 10, and a second member 32 that is disposed in the second seat 20. Specifically, the first recess 123 of the first seat 10 retains the first member 31 therein, and the second recess 22 of the second seat 20 retains the second member 32 therein. In this embodiment, the first member 31 and the second member 32 are magnets.

The releasing member 40 is connected to the first seat 10 and the second seat 20, and is convertible between a linked position (see FIG. 2), where the second seat 20 is proximate to the first seat 10, and the second member 32 is magnetically connected to the first member 31, and a released position (see FIG. 4), where the second seat 20 is away from the first seat 10, and the second member 32 is separated from the first member 31.

The releasing member 40 is tubular, and has a connecting end portion 41 corresponding in position to one of the first seat 10 and the second seat 20, and a distal end portion 43 opposite to the connecting end portion 41, and corresponding in position to the other one of the first seat 10 and the second seat 20. In this embodiment, the connecting end portion 41 and the distal end portion 43 are connected respectively to the first and second seats 10, 20, and the releasing member 40 is rotatable about the axis (L) to convert between the linked position and the released position. The releasing member 40 further has an engaging ring 42, and an inner surface 44. The engaging ring 42 is connected to the connecting end portion 41, and engages rotatably the ring-shaped groove 121 of the first seat 10. The inner surface 44 surrounds the axis (L), and faces the outer surrounding surface 25 of the second seat 20 when the releasing member 40 is in the linked position.

Figure 3:
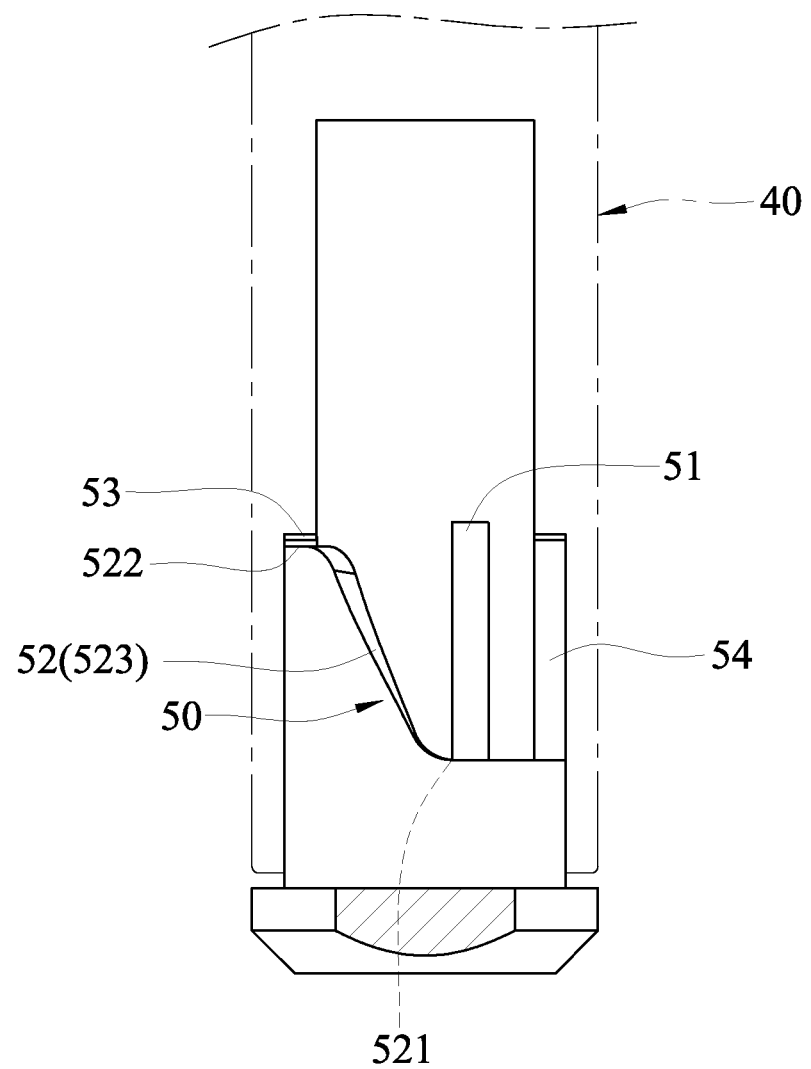
FIG. 3 is a schematic sectional view taken along line III-III in FIG. 2.

As further shown in FIG. 3, in this embodiment, the cam unit 50 is disposed between the second seat. 20 and the distal end portion 43 of the releasing member 40. The cam unit 50 is operable for moving the second seat 20 away from the first seat 10 for separating the second member 32 from the first member 31 when the releasing member 40 is rotated from the linked position to the released position (see FIG. 4). The cam unit 50 has two guide members 51 (only one is shown) and two cam portions 52 (only one is shown). The guide members 51 are formed on the inner surface 44 of the releasing member 40, and are disposed respectively at opposite sides of the axis (L). The cam portions 52 are disposed on the outer surrounding surface 25 of the second seat 20. Each of the cam portions 52 has a cam surface 523 that extends spirally and that has opposite lower and higher end sections 521, 522. The guide members 51 contact respectively and slidably the cam surfaces 523 of the cam portions 52. The cam unit 50 further has two higher stop portions 53 (only one is shown) and two lower stop portions 54 (only one is shown). Each of the higher stop portions 53 is connected to the higher end section 522 of a respective one of the cam portions 52. Each of the lower stop portions 54 is connected to the lower end section 521 of a respective one of the cam portions 52.

Referring to FIG. 2, in use, the second seat 20 is coupled to the first seat 10 by virtue of a magnetic attraction between the first and second members 31, 32, thereby coupling the strut 1 to the mudguard 2. Referring further to FIG. 3, at this time, the releasing member 40 is in the linked position, the first and second members 31, 32 of the magnetic unit 30 are disposed between the connecting end portion 41 and the distal end portion 43, i.e., the magnetic unit 30 is surrounded by the releasing member 40, and each of the guide members 51 is disposed at the lower end section 521 of a respective one of the cam portions 52.

Figure 4:
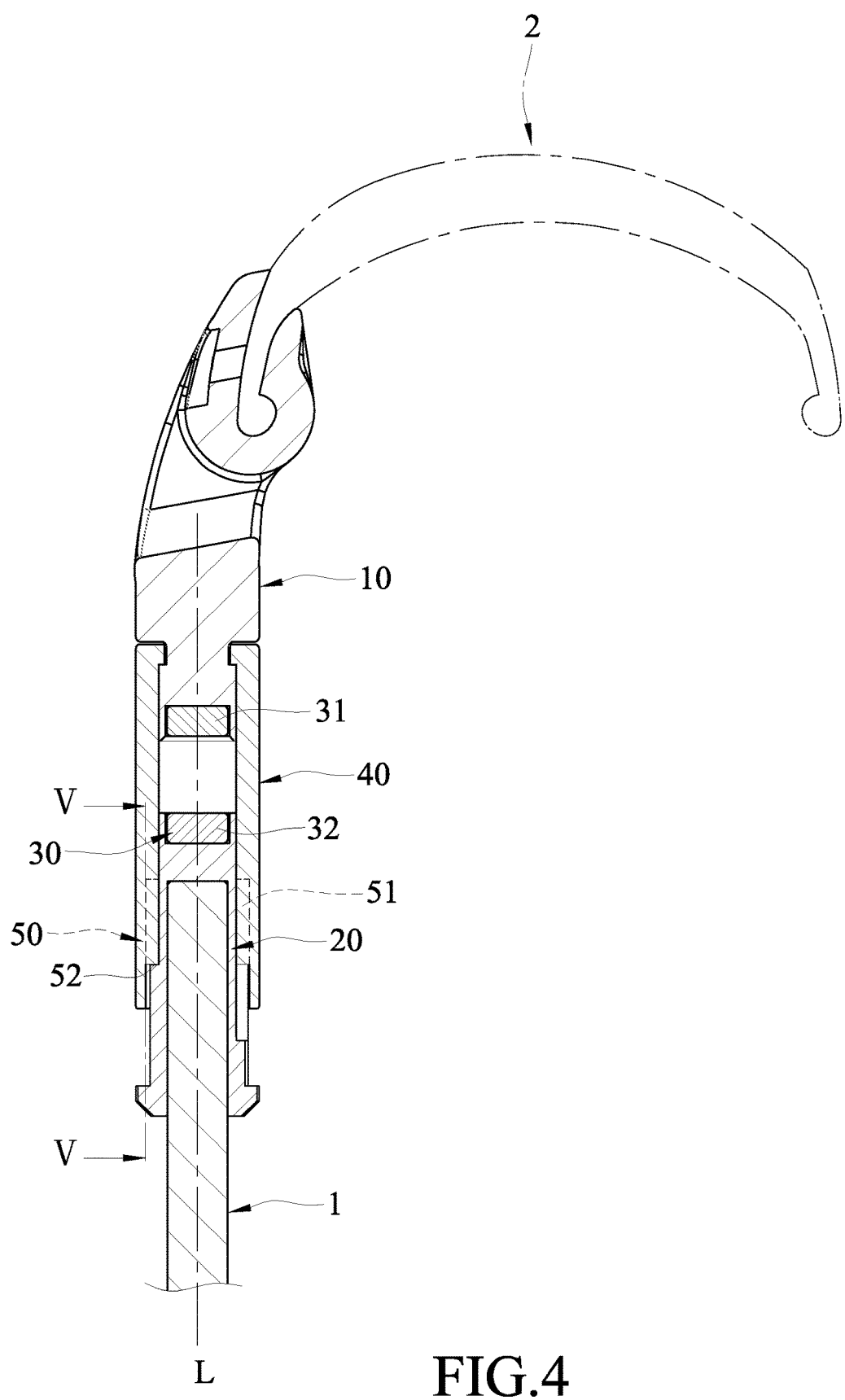
FIG. 4 is another sectional view of the embodiment, illustrating the releasing member being in a released position.
Figure 5:
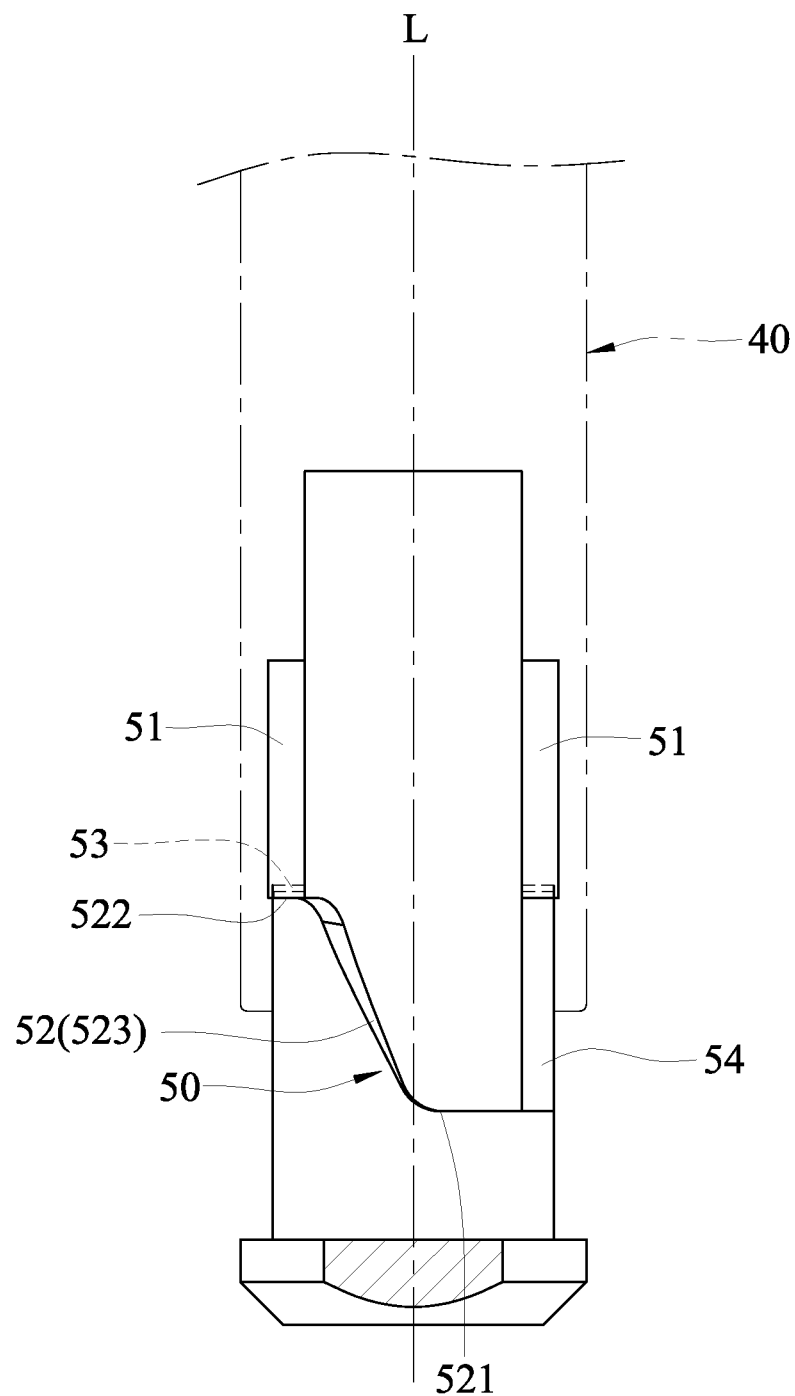
FIG. 5 is a schematic sectional view taken along line V-V in FIG. 4.

Referring to FIGS. 4 and 5, to remove the strut 1 from the mudguard 2, a user only needs to rotate the releasing member 40 about the axis (L) from the linked position to the released position, such that each of the guide members 51 slides on the cam surface 523 of the respective one of the cam portions 52 to the higher end section 522, thereby driving the second seat 20 to move away from the first seat 10 along the axis (L) and separating the second member 32 from the first member 31. At this time, each of the stop portions 53 abuts against a respective one of the guide members 51 for limiting the rotation of the releasing member 40 from the linked position to the released position.

Moreover, after the second seat 20 moves away from the first seat 10, the magnetic attraction between the first and second members 31, 32 decreases, and the user can easily pull the second seat 20 out of the releasing member 40, thereby completely separating the strut 1 from and the mudguard 2.

To reassemble the strut 1 back to the mudguard 2, the user simply inserts the second seat 20 into the releasing member 40 along the axis (L) to couple the second member 32 to the first member 31, so that the strut 1, the second seat 20, the first seat 10 and the mudguard 2 are coupled together. If the lower end sections 521 are not precisely and respectively aligned with the guide members 51 during the insertion of the second seat 20 into the releasing member 40, the user can slightly rotate the releasing member 40 to adjust the position of the guide members 51 relative to the lower end sections 521 to thereby facilitate the reassemble process.

As a result, by virtue of the magnetic attraction of the magnetic unit 30, the strut 1 can be easily coupled to the mudguard 2. The rotation of the releasing member 40 from the linked position to the released position drives the second seat 20 to move away from the first seat 10. Furthermore, in comparison with the aforesaid conventional coupling device, the assembling of the magnetic coupling device of the present disclosure is more convenient.

In addition, the strength of the magnetic attraction between the first and second members 31, 32 may be properly set to achieve safety release of the mudguard 2. When the mudguard 2 is pushed by a force that is generated from an object (such as clothing of a cyclist) being caught into the magnetic coupling device, and that is larger than the strength of the magnetic attraction of the magnetic unit 30, the mudguard 2 can be automatically separated from the strut 1 without the rotation of the releasing member 40 from the linked position to the released position.

Moreover, referring back to FIG. 2, since the first and second members 31, 32 are surrounded by the releasing member 40, the magnetic attraction of the magnetic unit 30 can be sustained without being interfered by any force in a direction transverse to the axis (L).

In other embodiments, the first seat 10 is not limited to be connected to the mudguard 2, the main body 11 of the first seat 10 may be connected to a frame of a bicycle (not shown) or another strut (not shown).

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that his disclosure is not limited to the disclosed embodiment but is intended to cover various arrangements included within the spirit and scope of the broadest interpretation so as to encompass all such modifications and equivalent arrangements.

What is claimed is:

1. A magnetic coupling device comprising:
   a first seat;
   a second seat connected to said first seat;
   a magnetic unit including
      a first member that is disposed in said first seat, and
      a second member that is disposed in said second seat; and
   a releasing member connected to said first seat and said second seat, and being convertible between a linked position, where said second seat is proximate to said first seat, and said second member is magnetically connected to said first member, and a released position, where said second seat is away from said first seat, and said second member is separated from said first member;

wherein said releasing member has
 a connecting end portion corresponding in position to one of said first seat and said second seat, and
 a distal end portion opposite to said connecting end portion, and corresponding in position to the other one of said first seat and said second seat;

wherein said first and second members of said magnetic unit are disposed between said connecting end portion and said distal end portion;

wherein said second seat extends along an axis;

wherein said releasing member is tubular and is rotatable about the axis to convert between the linked position and the released position;

wherein said connecting end portion of said releasing member is connected to said first seat and rotatable about the axis; and said magnetic unit is surrounded by said releasing member.

2. The magnetic coupling device as claimed in claim 1, further comprising at least one cam unit that is disposed between said second seat and said distal end portion of said releasing member, and that is operable for moving said second seat away from said first seat and for separating said second member from said first member when said releasing member is rotated from the linked position to the released position.

3. The magnetic coupling device as claimed in claim 2, wherein:
 said releasing member further has an inner surface;
 said second seat has an outer surrounding surface facing said inner surface;
 said cam unit has
  two guide members formed on said inner surface and disposed respectively at opposite sides of the axis, and
  two cam portions disposed on said outer surrounding surface of said second seat, each of said cam portions having a cam surface that extends spirally and that has opposite lower and higher end sections; and said guide members contact respectively and slidably said cam surfaces, such that rotation of said releasing member from the linked position to the released position drives said second seat to move away from said first seat along the axis.

4. The magnetic coupling device as claimed in claim 3, wherein said cam unit further has:
 two higher stop portions, each of which is connected to said higher end section of a respective one of said cam portions for abutting against a respective one of said guide members, thereby limiting the rotation of said releasing member from the linked position to the released position; and
 two lower stop portions, each of which is connected to said lower end section of a respective one of said cam portions for abutting against a respective one of said guide members, thereby limiting rotation of said releasing member from the released position to the linked position.

5. The magnetic coupling device as clamed in claim 1, wherein:
 said first seat has a protruding member having
  a ring-shaped groove,
  a first end surface that is perpendicular to the axis, and
  a first recess that is formed in said first end surface, and that retains said first member of said magnetic unit therein;
 said second seat has a second end surface facing said first end surface, and a second recess formed in said second end surface, and retaining said second member of said magnetic unit therein; and
 said releasing member further has an engaging ring connected to said connecting end portion, and engaging rotatably said ring-shaped groove.

6. The magnetic coupling device as claimed in claim 5, wherein:
 said first seat further has a main body from which said protruding member protrudes along the axis, and which has an engaging groove that is opposite to said protruding member, and that is adapted to be engaged with a mudguard; and
 said second seat is adapted to be connected to a strut.

* * * * *